(12) United States Patent
Terada et al.

(10) Patent No.: US 6,965,091 B2
(45) Date of Patent: Nov. 15, 2005

(54) PRESSING DEVICE

(75) Inventors: Akihiro Terada, Fujiyoshida (JP); Hideki Sugiyama, Yamanashi (JP); Masahiro Morioka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/964,651

(22) Filed: Sep. 28, 2001

(65) Prior Publication Data

US 2002/0038792 A1 Apr. 4, 2002

(30) Foreign Application Priority Data

Oct. 2, 2000 (JP) ........................................ 2000-301780

(51) Int. Cl.$^7$ ............................................... B23K 26/00
(52) U.S. Cl. ............................... 219/121.6; 219/121.63; 219/121.65
(58) Field of Search ......................... 219/121.6, 121.63, 219/121.64, 121.65, 121.66, 121.85

(56) References Cited

U.S. PATENT DOCUMENTS 5,603,853 A * 2/1997 Mombo-Caristan .... 219/121.64
5,814,185 A * 9/1998 Chun et al. .................. 156/580

FOREIGN PATENT DOCUMENTS

| JP | 4-80682 | 7/1992 | |
|----|---------|--------|---|
| JP | 11-226763 | 8/1999 | |
| JP | 200-237887 | * 9/2000 | ........... B23K/26/04 |
| JP | 2000-237887 | 9/2000 | |
| JP | 2001-191191 | 7/2001 | |
| JP | 2002-086285 | 3/2002 | |

* cited by examiner

Primary Examiner—M. Alexander Elve
(74) Attorney, Agent, or Firm—Staas & Halsey LLP

(57) ABSTRACT

A laser welding nozzle used as a working tool, a linear movement mechanism of a pressing device, and a servomotor are fixed to a bracket. A roller support frame is fixed on a moving side of the linear movement mechanism. A roller is pivotally mounted at a distal end of the roller support frame. The roller is located in the vicinity of a weld point of the laser welding nozzle. By driving the servomotor in a controlled manner, a portion in the vicinity of the weld point of a plate portion to be welded is pressed by the roller to restrain a floating of the weld portion, by which a gap between the plate portions is regulated, and thus uniform weld can be obtained. The pressing position, speed, and pressing force of roller can be controlled easily, so that the pressing device can be used for various types of workpieces.

21 Claims, 7 Drawing Sheets

PRESSING DEVICE

BACKGROUND OF THE INVENTION

1. Field of the Invention

The present invention relates to pressing means for pressing a plate portion at the time of working using various welding apparatuses or a laser beam machining apparatus, and an industrial robot.

2. Description of the Prior Art

When plate portions are welded, a gap between two lapped plate portions has an influence on the weld quality. Therefore, a method is known in which welding is performed while plate portions are pressed by a pressure roller or the like in order to correct the floating of plate portion so that the gap is kept constant.

For example, Japanese Patent Application Laid-Open No. 8-90264 has discloses a method in which welding is performed while plate portions to be welded are pressed by a roller from the upside of the lap joint in laser welding. FIG. 14 shows a method for laser welding. In this method, a bracket 67 attached to the distal end of a robot arm 100 is provided with a laser welding nozzle 64 used as a working tool and an air cylinder 60 used as a driving source for pressing plate portions, which are welded parts of workpieces 1a and 1b. A roller support frame 61 for supporting a roller is attached to a slider, which is a movable part of the air cylinder 60, and a roller 62 is rotatably mounted at the distal end of the roller support frame 61. The roller 62 can be displaced vertically by the extending/retracting operation of the air cylinder 60. When laser welding is performed, the air cylinder 60 is operated to press the roller 62 on the plate portions of the workpieces 1a and 1b to be welded by the welding nozzle 64 in the vicinity of the weld portion. Thus, laser welding is performed along a weld line while the floating of plate portions of the workpieces 1a and 1b is corrected so that the gap is regulated.

Also, there is publicly known a construction in which a damper 66 such as a coil spring is disposed in place of the air cylinder 60 so that a constant pressing force is applied to the roller 62 by the damper 66 as shown in FIG. 15 (see Japanese Patent Application Laid-Open No. 9-327781).

In the case where a coil spring is used to control the pressing force of the roller, the pressing force cannot be controlled, and various kinds of plate portions of workpieces with different shapes and plate thicknesses cannot be pressed by one type of pressing device. In order to press such various kinds of plate portions, it is necessary to replace the spring with one having a different spring constant.

Also, as described above, in the case where an air cylinder is used to control the pressing force of roller, only a fixed pressing force can be given because a general electromagnetic valve can merely turn on or off air, so that various kinds of plate portions cannot be pressed as in the case of the coil spring. Even in case of using the air cylinder, pressure can be controlled by using a proportional control valve to regulate the pressing force. In this case, however, there arises a problem in that the response is slow, so that it is difficult to delicately change the pressing force during high-speed welding and working.

Also, the conventional construction is such that only a damper is disposed so as to respond to variations in distance between the working tool such as a welding head and the plate portion, and the roller pressing direction cannot be changed when the angle of the working tool such as a welding head with respect to the plate portion changes. Therefore, if the angle of the working tool such as a welding head with respect to the plate portion changes, the pressing force changes accordingly, which presents a problem in that high-quality working including welding cannot be performed.

OBJECTS AND SUMMARY OF THE INVENTION

An object of the present invention is to provide a pressing device capable of being controlled so that a proper pressing force of a roller is applied to workpieces with different shapes and thicknesses.

To attain the above object, the present invention provides a pressing device which is moved along a working line in a region in the vicinity of the working line while the surface of a plate portion of the workpiece in the vicinity of the working line is pressed in the plate thickness direction by a rotating roller to prevent the floating of a portion to be worked, wherein a servomotor is used as a driving source for moving the roller to press the roller on the plate portion in the plate thickness direction, by which the position, pressing speed, pressing force, and the like of the roller for pressing the plate portion can be controlled easily.

Specifically, the pressing device includes a roller for pressing the region in the vicinity of the working line, a frame for supporting the roller, a mechanism for straight moving the roller support frame in the direction such that the roller support frame is brought close to or separated from the portion to be worked, and a servomotor for driving the linear movement mechanism.

Also, in place of the linear movement mechanism, a mechanism for rotationally moving the roller support frame around a predetermined axis substantially perpendicular to the working advance direction of the pressing device is provided, and the rotational movement mechanism is driven by the servomotor.

Also, a linear motor is used in place of the servomotor, and the linear motor also serves as the linear movement mechanism so that the need for providing the linear movement mechanism is eliminated.

In the configuration described above, a desired pressing force is obtained by controlling the current to the servomotor. Also, means for measuring the position or speed of the roller and means for carrying out feedback control according to the measurement result are provided, by which feedback control is carried out. Also, an observer for estimating a pressing force of the roller and means for carrying out force feedback control based on a commanded pressing force and an estimated pressing force estimated by the observer are provided, by which the feedback control of pressing force is carried out.

Further, a working tool mounting section for mounting a working tool is provided at a position on the fixed side or on the moving side of the movement mechanism of the pressing device. Also, the working may be laser beam machining.

Further, a working robot is configured by installing the above-described pressing device at the distal end of a robot arm. Thereby, the servomotor of the pressing device is controlled by a robot controller. Also, a robot teaching pendant is provided with means capable of inputting at least any one of the position, speed, and pressing force of the roller support frame of the pressing device and the distance between the working tool mounted on the working tool mounting section and the plate portion. Thereby, the above-described data can be inputted and controlled. Alternatively, the data can be commanded by a robot program command.

Since the pressing device in accordance with the present invention has the above-described configuration, the pressing operation of the roller of the pressing device is controlled by the servomotor. Therefore, the position, speed, and pressing force of the roller can be controlled easily, so that the optimum pressing force can be applied to the plate portion even for various types of workpieces.

BRIEF DESCRIPTION OF THE DRAWINGS

The above-described object and other objects and features of the present invention will be apparent from the following description of embodiments with reference to the accompanying drawings, in which.

DETAILED DESCRIPTION OF THE PREFERRED EMBODIMENTS

A first embodiment of the present invention will be described with reference to FIGS. 1 and 2.

Figure 1:
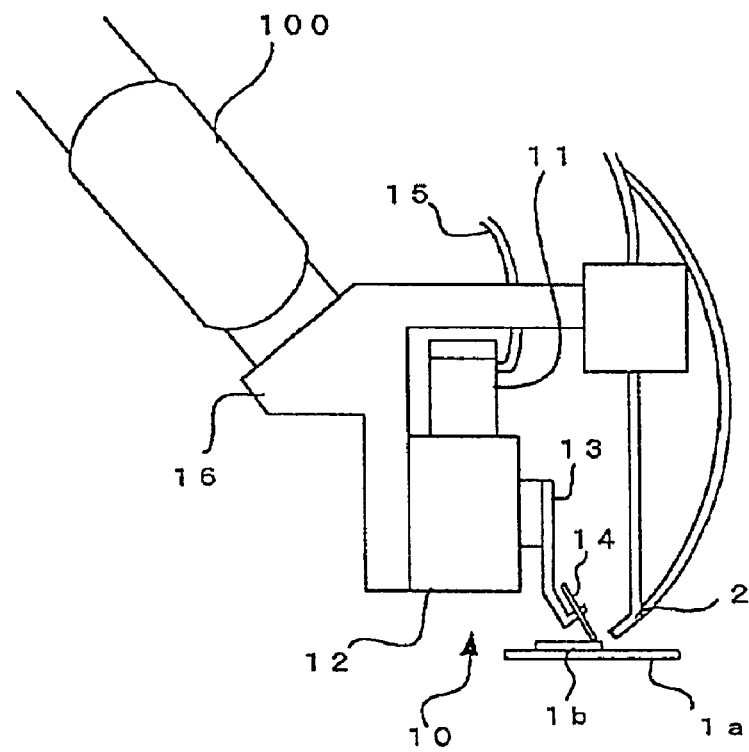
FIG. 1 is a schematic view showing an example in which a pressing device of a first embodiment of the present invention is applied to a case where a working tool is a welding torch.

FIG. 1 shows an example of a pressing device applied to welding operation using a welding torch as a working tool.

In FIG. 1, a pressing device 10 is made up of a bracket 16, a servomotor 11, a linear movement mechanism 12 driven by the servomotor 11, a roller support frame 13 fixed to a moving member of the linear movement mechanism 12, and a roller 14 pivotally mounted at the distal end of the roller support frame 13. The configuration is such that the bracket 16 of the pressing device 10 is installed at the distal end of a robot arm 100, by which the pressing device 10 is mounted on the robot arm 100. Further, the bracket 16 has a working tool mounting section, and in the example shown in FIG. 1, a welding torch 2 is mounted to the working tool mounting section. In the figure, reference numeral 15 denotes a cable for the servomotor 11.

When the servomotor 11 is driven, the roller 14 can move straight via the linear movement mechanism 12 and the roller support frame 13 in the direction such as to come close to or go apart from plate portions of workpieces 1a and 1b.

The welding torch 2 and the pressing device 10 are fixed to the bracket 16 so that the distal end of the roller 14 is located in the vicinity of the weld point of the welding torch 2.

When welding is performed, the workpieces 1a and 1b are welded by the welding torch 2 while the floating of the workpieces 1a and 1b is prevented by the roller 14 of the pressing device 10 pressing the plate portion of the upper workpiece 1b, and at the same time, the welding torch 2 and the roller 14 are moved along a weld line. For this pressing device 10, the positional relationship between the distal end of the welding torch 2 and the roller 14 is variable. In other words, the positional relationship between the weld point and the roller 14 is variable. Therefore, by changing the position of the roller 14 via the linear movement mechanism 12 by driving the servomotor 11, the relationship between the position of weld point and the position at which the plate portion is pressed by the roller 14 can be set optimum for various types of workpieces with a different plate thickness. Thereby, the roller 14 is always brought into contact with the plate portion so as to always press the weld portion to prevent floating, so that a gap between the plate portions of the workpieces 1a and 1b can be regulated.

Also, this embodiment can also be applied to the case where welding is performed at the welding start point, welding finish point and the like by changing the weld point while the plate portion is pressed by the roller 14. Further, the pressing force can be controlled by controlling a torque delivered by the servomotor 11.

Figure 2:
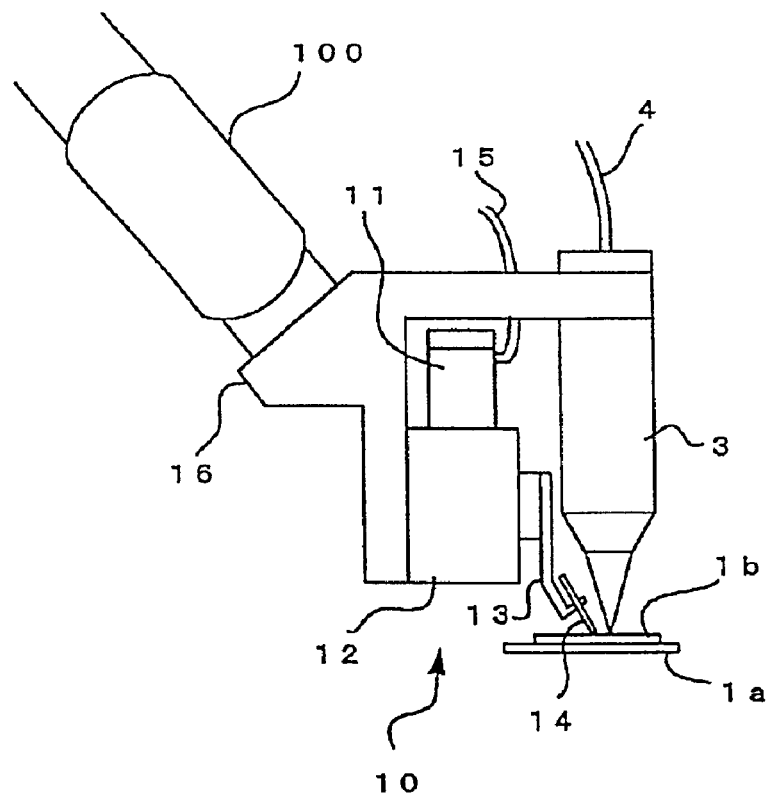
FIG. 2 is a schematic view showing an example in which a pressing device of the first embodiment of the present invention is applied to a case where a working tool is a laser welding nozzle.

FIG. 2 shows an example of a pressing device applied to welding operation using a laser welding nozzle as a working tool.

As shown in FIG. 2, a laser welding nozzle 3 and the linear movement mechanism 12 are installed to the bracket 16 so that the pressing portion of the roller 14 is located in the vicinity of the focus of weld portion of the laser welding nozzle 3. When welding is performed by using this laser welding nozzle 3, as in the case where welding is performed by using the welding torch shown in FIG. 1, the servomotor 11 is driven so that the roller 14 presses the plate portion of the upper workpiece 1b of the lapped plate portions of the workpieces 1a and 1b, by which a gap between the two lapped plate portions is regulated.

Laser welding is performed while the robot is moved and thus the welding nozzle 3 and the roller 14 are moved along a weld line. In FIG. 2, reference numeral 4 denotes an optical fiber.

In an example shown in FIG. 2 as well, by controlling the position, speed, and torque of the servomotor 11, the position of the roller 14 with respect to the distal end of the welding nozzle 3 can be changed, and also the pressing force on the plate portion can be controlled so that the gap between the two plate portions can be regulated. Therefore, this pressing device can be used for welding workpieces with various shapes and plate thicknesses.

Figure 3:
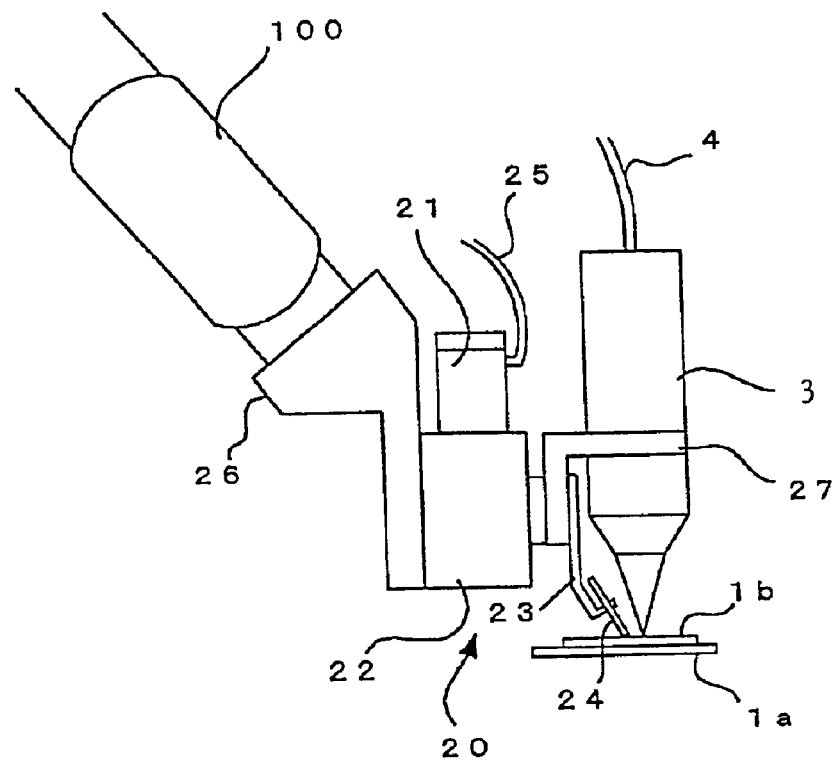
FIG. 3 is a schematic view showing an example in which a pressing device of a second embodiment of the present invention is applied to a case where a working tool is a laser welding nozzle.

Next, a second embodiment of the present invention will be described with reference to FIG. 3.

A pressing device 20 of this embodiment is made up of a bracket 26, a servomotor 21, a linear movement mechanism 22, an attaching member 27, a roller support frame 23, and a roller 24. The linear movement mechanism 22 is mounted on a robot by the bracket 26 installed at the distal end of the arm 100 of the robot. The attaching member 27 is fixed on the moving side of the linear movement mechanism 22, and the roller support frame 23 is fixed to the attaching member 27. Further, a laser welding nozzle 3 is mounted in a working tool mounting section provided on the attaching member 27. At the distal end of the roller support frame 23, the roller 24 is pivotally mounted. In this second embodiment, since the laser welding nozzle 3 and the roller support frame 23 are fixed on the moving side of the linear movement mechanism 22, the positional relationship between the distal end of the welding nozzle 3 and the roller 24 is fixed.

By driving the servomotor 21 so that the rotational motion of the servomotor 21 is converted into linear motion by the linear movement mechanism 22 and thus the welding nozzle 3 and the roller support frame 23 are moved, the distal end of the welding nozzle 3 and the roller 24 are brought close to the plate portions of workpieces 1a and 1b, and further laser welding is performed while the plate portions of the workpieces 1a and 1b are pressed by the roller 24. At the same time, the robot is driven to move the roller 24 and the welding nozzle 3 along a weld line, by which welding operations are carried out.

In the second embodiment, the positional relationship between the roller 24 and the laser welding nozzle 3 is always fixed, and welding is performed while the plate portions of the workpieces 1a and 1b are pressed by the roller 24. Therefore, the focus of a laser beam emitted from the laser welding nozzle 3 is located at a substantially fixed position with respect to the workpieces 1a and 1b, so that uniform welding operation can be performed.

Figure 8:
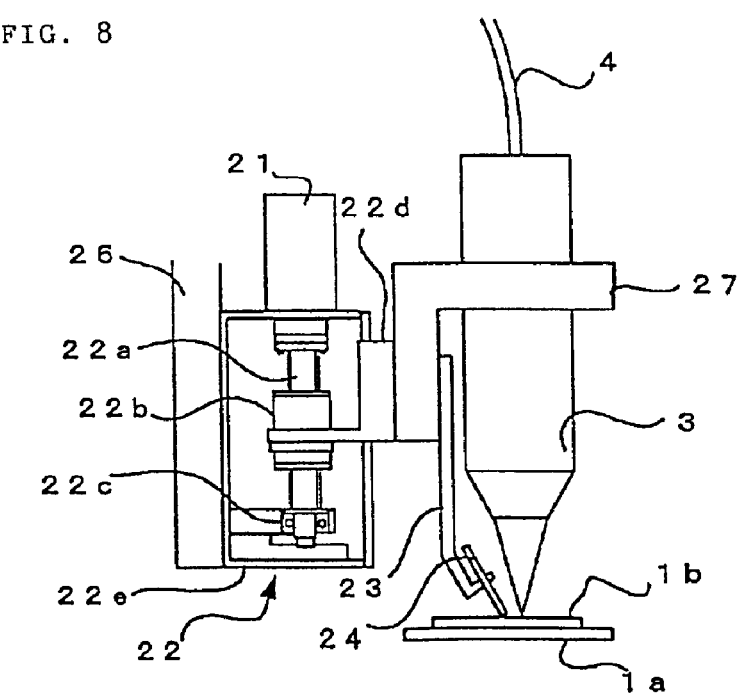
FIG. 8 is a schematic view showing one example of a linear movement mechanism used in the first and second embodiments of the present invention.

FIG. 8 shows one example of the aforementioned linear movement mechanism. Although FIG. 8 shows an example of the linear movement mechanism 22 used in the second embodiment shown in FIG. 3, the linear movement mechanism 12 used in the first embodiment shown in FIGS. 1 and 2 is also constructed in the same way.

For the linear movement mechanism 22, a ball screw 22a whose both ends are supported by bearings 22c is disposed in a frame 22e fixed to the bracket 26. To a ball nut 22b threadedly engaged with the ball screw 22a, a slider 22d on the moving side of the linear movement mechanism 22 is fixed. By rotationally driving the ball screw 22a by using the servomotor 21, the ball nut 22b is moved straight, and thus the attaching member 27 fixed to the ball nut 22b, the roller support frame 23 attached to the attaching member 27, and the welding nozzle 3 are moved straight.

As this linear movement unit, in place of the aforementioned combination of the ball screw 22a and the nut 22b, a rotational/linear motion converting mechanism such as a rack and pinion can be used.

Figure 12:
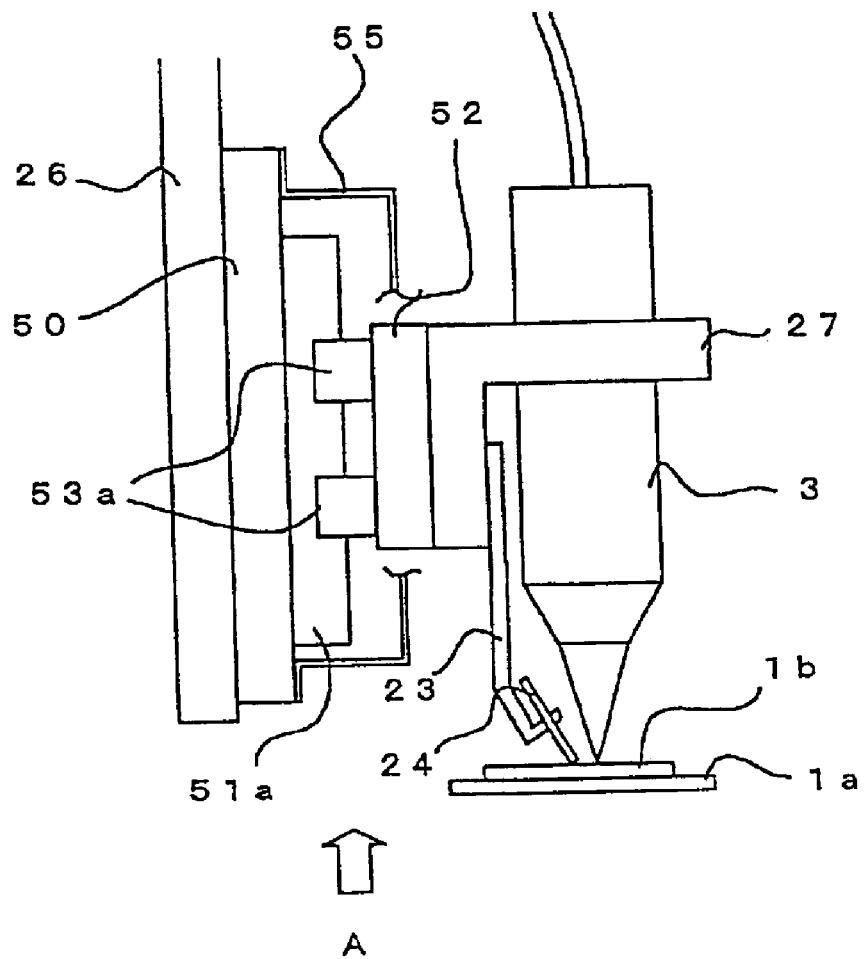
FIG. 12 is a schematic view showing an example in which a linear movement mechanism used in the first and second embodiments of the present invention is formed of a linear motor.
Figure 13:
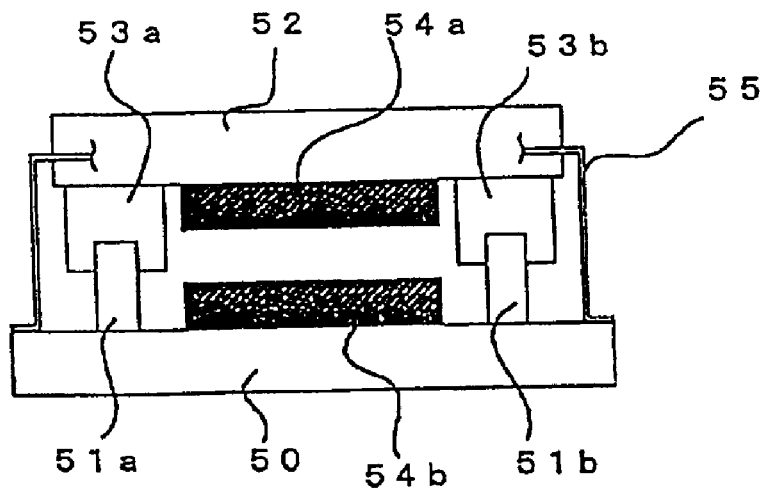
FIG. 13 is a view taken in the direction of an arrow A of FIG. 12.
Figure 14:
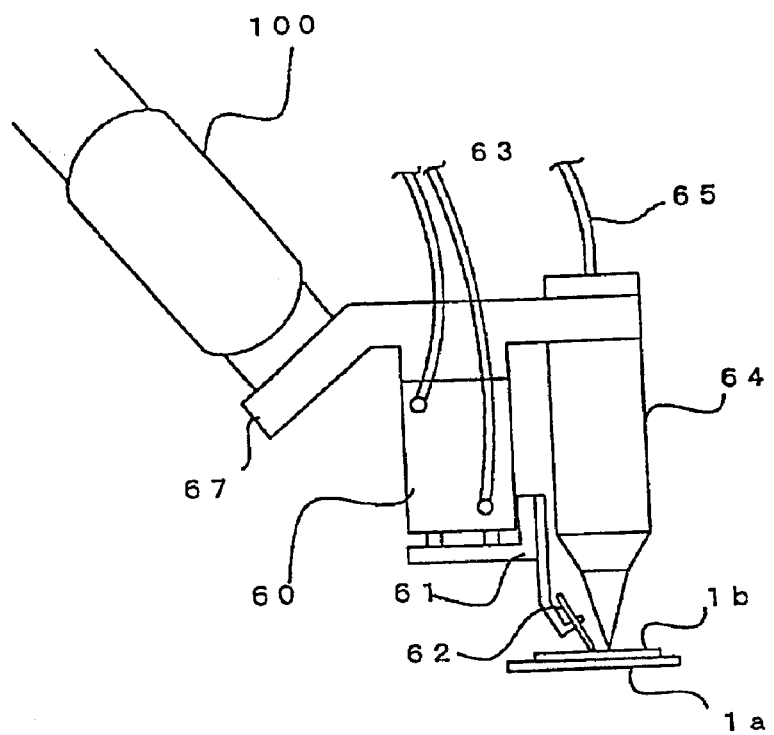
FIG. 14 is an explanatory view of a conventional pressing device driven by an air cylinder.
Figure 15:
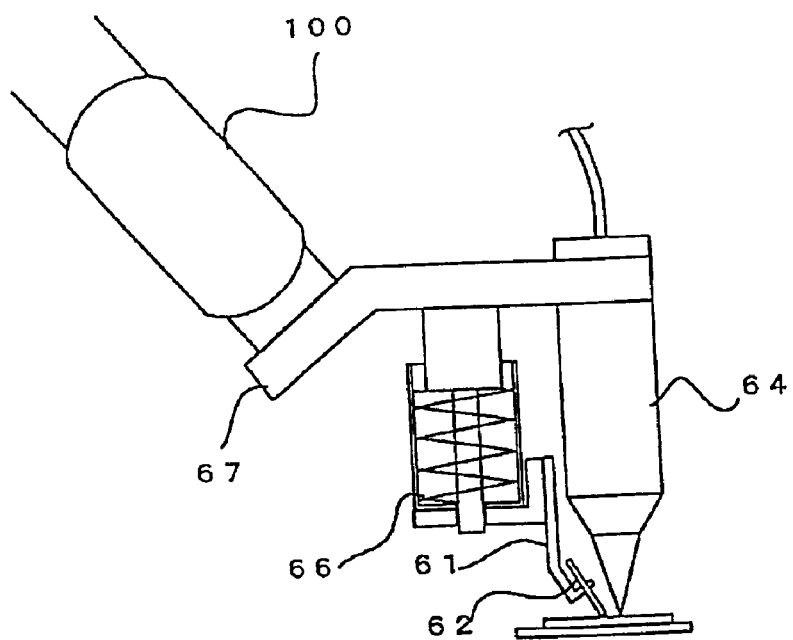
FIG. 15 is an explanatory view of the conventional pressing device in which a pressing force is developed by a damper formed of a coil spring in place of an air cylinder.

Also, as shown in FIGS. 12 and 13, a linear motor can be used in place of the rotary-type servomotor and the rotational/linear motion converting mechanism. FIG. 12 is an explanatory view showing a case where a linear motor is used in place of the linear movement mechanism 22 used in the second embodiment shown in FIG. 3, and FIG. 13 is a sectional view taken in the direction of an arrow A of FIG. 12.

A base 50 for a linear motor is fixed to the bracket 26, and two rails 51a and 51b are installed in parallel to each other on the base 50. A slider 52, which is disposed so as to be opposed to the base 50, is provided with blocks 53a and 53b engaged with the paired rails 51a and 51b. On the opposed faces of the base 50 and the slider 52, a magnet 54a, which is an electrical part of the linear motor, is disposed on one face, and a coil 54b is disposed on the other face. In FIGS. 12 and 13, reference numeral 55 denotes a cover for the linear motor.

In the examples shown in FIGS. 12 and 13, by driving the linear motor shown in FIG. 13, the slider 52 is moved straight, and thus the laser welding nozzle 3 and the roller support frame 23 and the roller 24 are moved straight as a unit, by which these elements can be brought close to or separated from the plate portions of the workpieces 1a and 1b similarly as in the aforementioned second embodiment. Thus, laser welding is performed while the roller 24 is pressed on the plate portions of the workpieces 1a and 1b to prevent the floating of the plate portion.

Next, a third embodiment of the present invention will be described with reference to FIGS. 4, 5 and 6.

A pressing device 30 of this embodiment is made up of a bracket 36, a servomotor 31, a speed reducing unit 32, a roller support frame 33, and a roller 34. The pressing device 30 is mounted on a robot by the bracket 36 attached to the robot arm 100.

The bracket 36 is mounted with the speed reducing unit 32 and the servomotor 31. On the output shaft of the speed reducing unit 32 is fixed the roller support frame 33. At the distal end of the roller support frame 33, the roller 34 is pivotally mounted. Also, a laser welding nozzle 3 is installed in a working tool mounting section of the bracket 36, and the distal end of the roller 34 is disposed at a position in the vicinity of the distal end of the laser welding nozzle, that is, in the vicinity of the weld portion.

When the servomotor 31 is driven, the rotational speed thereof is reduced by the speed reducing unit 32 constituting a rotational movement mechanism, and the roller support frame 33 is turned (in the direction perpendicular to the paper face in FIG. 4) via the output shaft of the speed reducing unit 32. By the turning force of the roller support frame 33, the roller 34 presses the plate portions of workpieces 1a and 1b to correct a gap between the plate portions of the two workpieces 1a and 1b. Thus, laser welding is performed by a laser beam emitted from the laser welding nozzle.

Figure 4:
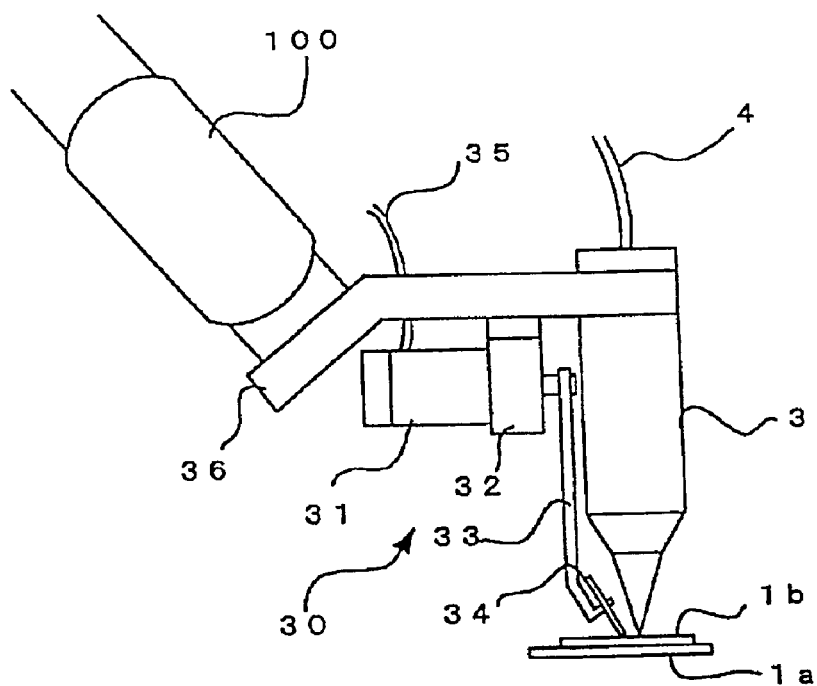
FIG. 4 is a schematic view showing an example in which a pressing device of a third embodiment of the present invention is applied to a case where a working tool is a laser welding nozzle.
Figure 5:
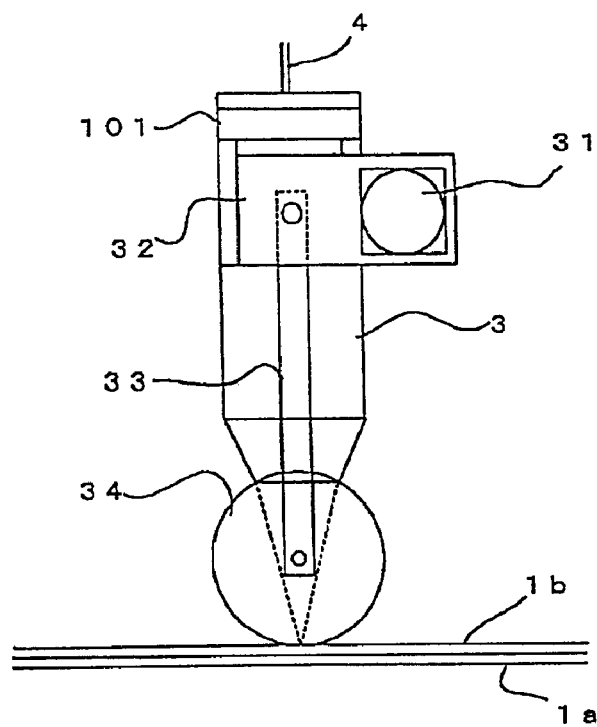
FIG. 5 is a schematic view showing a positional relationship between the laser welding nozzle and the pressing device in the third embodiment of the present invention.

FIG. 5 is a schematic view of the pressing device 30 viewed from the left-hand side of FIG. 4. FIG. 6 is an explanatory view in a case where the incident angle of a laser welding nozzle 3 with respect to the workpieces 1a and 1b is changed in FIG. 5.

Figure 6:
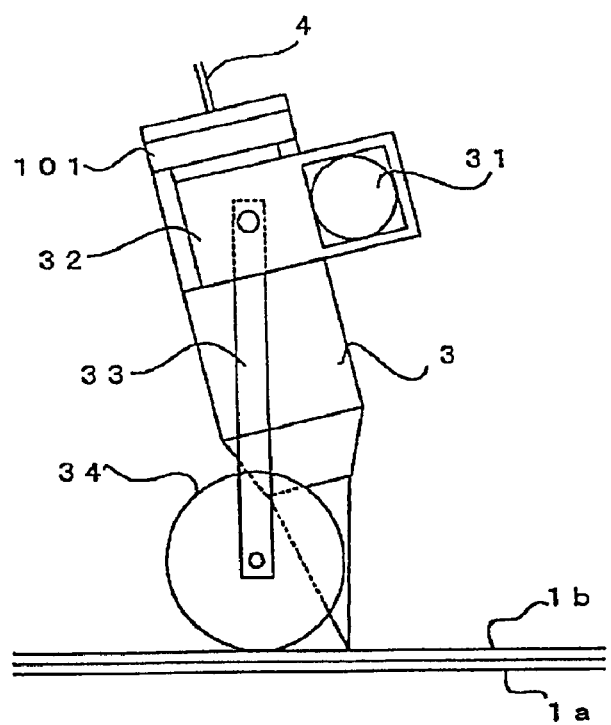
FIG. 6 is a schematic view showing the positional relationship between the laser welding nozzle and the pressing device in the third embodiment of the present invention in a case where the angle at which a laser beam from the laser welding nozzle is incident on a workpiece is changed.

As shown in FIGS. 5 and 6, the roller support frame 33 can be turned around the output shaft of the speed reducing unit 32 in the same direction as the direction of rotation of the roller 34. Therefore, even when the incident angle of a laser beam from the laser welding nozzle 3 with respect to the workpieces 1a and 1b is changed, or even when the relative angle between the plate portions of the workpieces 1a and 1b and the pressing device 30 is varied at the time of welding, the roller 34 is brought into contact with the plate portions of the workpieces 1a and 1b, so that desired pressing operation can be performed.

Figure 7:
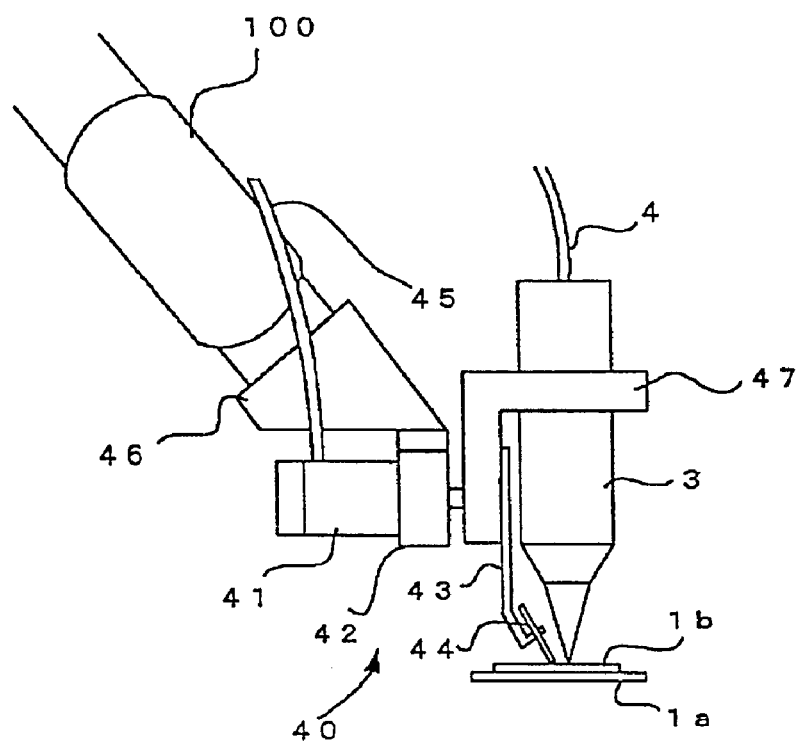
FIG. 7 is a schematic view showing an example in which a pressing device of a fourth embodiment of the present invention is applied to a case where a working tool is a laser welding nozzle.

FIG. 7 is an explanatory view of a pressing device in accordance with a fourth embodiment of the present invention. This fourth embodiment differs from the third embodiment shown in FIG. 4 in that the laser welding nozzle can also be turned together with the roller support frame.

A bracket 46 installed at the distal end of the robot arm 100 is mounted with a speed reducing unit 42 and a servomotor 41. An attaching member 47 is fixed to the output shaft of the speed reducing unit 42, and a laser welding nozzle 3 is mounted in a working tool mounting section of the attaching member 47. Also, a roller support frame 43 is fixed to the attaching member 47. At the distal end of the roller support frame 43, a roller 44 is pivotally mounted, and the distal end of the roller 44 is located in the vicinity of the position of the distal end of the laser welding nozzle 3.

When the servomotor 41 is driven, the rotational speed thereof is reduced by the speed reducing unit 42, and the output thereof is taken out to the output shaft to turn the attaching member 47. As a result, the laser welding nozzle 3 and the roller support frame 43, which are attached to the attaching member 47, are turned together with the attaching member 47. The positional relationship between the roller 44 and the laser welding nozzle 3 is not changed, and the roller 44 and the laser welding nozzle 3 are turned while the positional relationship is held. Thus, if welding is performed by a laser beam emitted from the laser welding nozzle 3 while the plate portions of workpieces 1a and 1b are pressed by the roller 44, the focus position of the laser beam with respect to the plate portions of the workpieces 1a and 1b becomes fixed, so that uniform welding operation can be performed.

Figure 9:
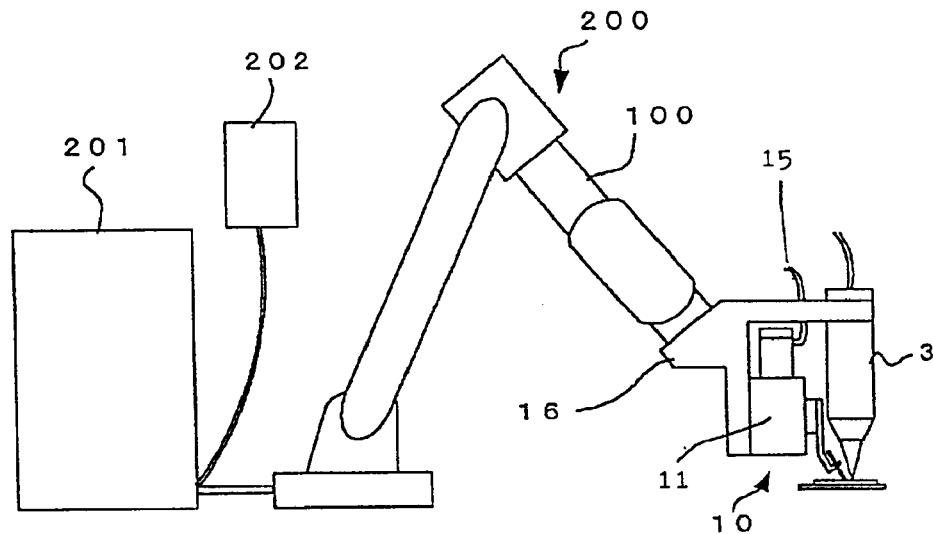
FIG. 9 is a schematic view of a robot system in which a pressing device in accordance with the present invention is mounted on a robot.

Next, the mounting of the pressing devices in accordance with the first to fourth embodiments, which have been described above, to a robot will be described with reference to FIG. 9.

Although an example in which the pressing device 10 in accordance with the first embodiment is mounted on a robot will be explained in the following description, this explanation can also be applied to examples in which the pressing devices 20, 30 and 40 in accordance with the second to fourth embodiments are mounted.

The pressing device 10 is installed at the distal end of the arm 100 of a robot body (mechanism section) 200. The robot body 200, which is connected to a robot controller 201, is controlled by the controller 201. Further, the servomotor 11 of the pressing device 10 is also connected to the robot controller 201 via the motor cable 15.

The robot controller 201 is connected with a teaching pendant 202. The robot body 200 and the pressing device 10 are controlled by the robot controller 201, and are driven by a program or a command sent from the teaching pendant 202. In the example shown in FIG. 9, the pressing device 10 is connected to what is called an additional axis that the robot controller 201 has, and the servomotor 11 of the pressing device 10 is controlled as the additional axis of the robot controller 201.

The teaching pendant 202 is not only provided, like the conventional teaching pendant for the robot controller, with various commanding means such as pushbuttons for manually moving the axes of robot, pushbuttons for manually moving a tool center point in the axis directions in an orthogonal coordinate system, and teach buttons for teaching the teaching point as well as display means such as LED but also provided with means for inputting the position, speed, and pressing force of the roller support frame of the pressing device, the distance between the working tool mounted in the working tool mounting section and the plate portions, and the like in relation to the present invention.

The motor cable for connecting the servomotor 11 of the pressing device 10 to the robot controller 201 may be run in the robot body 200 or may be run on the outside.

Since the pressing device 10 is mounted on the robot and is controlled by the robot controller 201, the versatility increases, and the pressing device can be used for various kinds of working merely by changing the teaching of the robot. Since the robot and the pressing device are controlled by a common robot controller, the pressing device can be operated in association with the motion of robot body. Also, when working (welding etc.) is performed on the plate portion of a complicated workpiece with a three-dimensional shape by the motion of robot, working can be performed while the plate portion is pressed to prevent the floating of the portion to be worked, so that the application range of robot can be extended.

Next, a position and speed control loop for controlling the servomotor that drives the roller support frame of the pressing device in accordance with the first to fourth embodiments, which has been described above, will be explained with reference to a block diagram of FIG. 10. This position and speed control loop is the same as the publicly known one.

Although a position and speed control loop for controlling the servomotor 11 that drives the roller support frame 13 of the pressing device 10 in accordance with the first embodiment will be explained in the following description, this explanation can also be applied to position and speed control loops for controlling the servomotors 21, 31 and 41 that drive the roller support frames 23, 33 and 43 of the pressing devices 20, 30 and 40 in accordance with the second to fourth embodiments.

Figure 10:
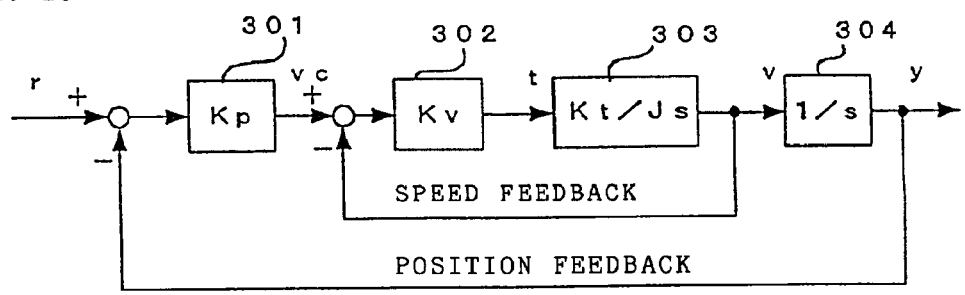
FIG. 10 is a block diagram of a position and speed feedback control system for a servomotor used in the embodiments of the present invention.

In FIG. 10, Kp of element 301 denotes a position loop gain of a position control loop (proportional control), and Kv of element 302 denotes a speed loop gain of a speed control loop (proportional-plus-integral control etc.). Also, element 303 is an element indicating the transfer function of servomotor, in which Kt denotes a torque constant, and J denotes an inertia. Element 304 is an element indicating the transfer function for determining position y from motor speed v. Reference character s denotes the Laplace operator.

A position feedback value based on the information sent from position and speed detectors installed on the servomotor etc. is subtracted from a movement command r of the roller support frame 13 with respect to the plate portions of the workpieces 1a and 1b. By multiplying the difference by the position loop gain Kp, a speed command vc is determined. By subtracting a speed feedback value based on the information sent from the position and speed detectors from the speed command vc, speed loop processing is performed to determine a torque command (current command) t, by which the servomotor of the pressing device is driven.

Since the position and speed of the servomotor for driving the roller support frame 13 of the pressing device is controlled, the position and speed of approaching, pressing, and separating of the roller pivotally mounted at the distal end of the roller support frame with respect to the plate portions of the workpieces 1a and 1b are controlled.

For the pressing device 10 (FIGS. 1 and 2) in accordance with the first embodiment and the pressing device 30 (FIG.

4) in accordance with the third embodiment, by controlling the position of the roller support frame 13, 33, the relative position of the roller 14, 34 of the pressing device with erspect to the working tool (welding torch 2, welding nozzle 3, etc.) and can be controlled at will, so that the optimum working operation of various types of workpieces can be performed.

For the pressing device 20 (FIG. 3) in accordance with the second embodiment and the pressing device 40 (FIG. 7) in accordance with the fourth embodiment, although the relative positional relationship between the working tool (welding torch 2, welding nozzle 3, etc.) and the roller 24, 44 of the pressing device cannot be changed, the position of working tool with respect to the plate portions of the workpieces 1a and 1b can be controlled in accordance with a command. Especially in the case where, for example, a jig for fixing the plate portions exists at the halfway point on the working path, the position control can easily be carried out in such a manner that when the roller of pressing device comes to a portion at which the plate portions are held by the jig, the roller is separated from the plate portions to avoid the interference of the roller with the jig, and after the roller has moved to a position at which it does not interfere with the jig, the pressing of the roller on the plate portions is restarted.

Furthermore, for the pressing devices 10, 20, 30 and 40 in accordance with the first to fourth embodiments, by regulating the speed control loop gain, control can be carried out to prevent fluctuations in pressing force of the roller 14, 24, 34, 44 on the workpieces 1a and 1b from occurring.

Also, in the servomotor control system for the pressing device shown in FIG. 10, the configuration may be such that a torque limiter for controlling the torque command, which is a current command, is provided, and a torque delivered from the servomotor is limited to a preset value set in the torque limiter, by which the pressing force of the roller of pressing device on the workpieces 1a and 1b can be controlled.

Figure 11:
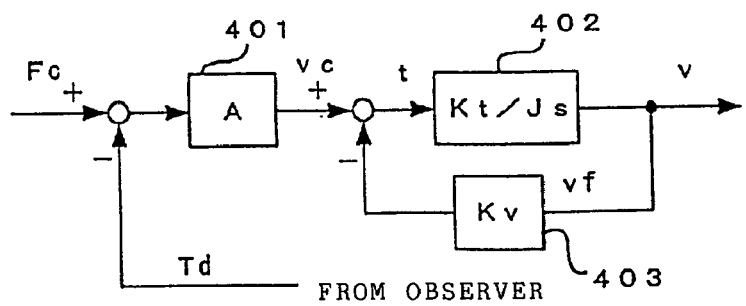
FIG. 11 is a block diagram of a feedback control system for a force used in the embodiments of the present invention.

Furthermore, the pressing force may be feedback controlled. FIG. 11 is a block diagram of a force control loop incorporated into the servomotor control system when the feedback control of the pressing force is carried out. In FIG. 11, A of element 401 denotes a gain (proportional gain) of a force control loop for carrying out the feedback control of pressing force. Element 402 is an element indicating the transfer function of motor, in which Kt denotes a torque constant, and J denotes an inertia. Also, Kv of element 403 denotes a speed loop gain of a speed control loop.

Also, in FIG. 11, the pressing force of pressing device on the plate portions is estimated by an observer which is incorporated into the servomotor control system to estimate disturbance applied to the servomotor. Thus, the pressing force estimated by the observer is fed back, by which the pressing force is controlled. The observer is publicly known disturbance estimating means, so that detailed explanation thereof is omitted here.

An estimated pressing force Td estimated by the observer is subtracted from a commanded pressing force Fc given as a target value of pressing force on the plate portions of the workpieces 1a and 1b, and the difference is multiplied by the gain A to determine a speed command vc. A value obtained by multiplying a speed feedback value, which is detected by the speed detector and fed back, by the speed loop gain Kv is subtracted from the speed command vc to determine a current command (torque command) t, by which the servomotor is driven.

Thus, the pressing force is estimated by the observer, and feedback control is carried out so that the estimated pressing force coincides with the pressing force preset as the target value. Even in the case where this force feedback control is used, since the speed control loop is incorporated as a minor loop for force feedback control in this example, the occurrence of fluctuations in pressing force can be prevented by regulating the speed loop gain Kv of the speed control loop.

What is claimed is:

1. A pressing device which is used together with a working tool when working of a plate portion is performed, in such a manner as to be moved along a working line in a region in the vicinity of said working line while the surface of said plate portion in the vicinity of said working line is pressed in a plate thickness direction by a rotating roller to prevent a floating of a portion to be worked, wherein a servomotor is used as a driving source for moving said roller to press said roller on said plate portion in the plate thickness direction.

2. The pressing device according to claim 1, further comprising means for measuring the position or speed of said roller and means for carrying out feedback control according to a measurement result.

3. The pressing device according to claim 1, further comprising a working tool mounting section for mounting the working tool.

4. A pressing device which is used together with a working tool when working of a plate portion is performed, in such a manner as to be moved along a working line in a region in the vicinity of said working line while the surface of said plate portion in the vicinity of said working line is pressed in the plate thickness direction to prevent the floating of a portion to be worked, comprising:

a roller for pressing said region in the vicinity of the working line;

a frame for supporting said roller;

a mechanism for linearly moving said roller support frame in the direction such that said roller support frame is brought close to or separated from said portion to be worked; and a servomotor for driving said linear movement mechanism.

5. The pressing device according to claim 4, further comprising means for measuring the position or speed of said roller and means for carrying out feedback control according to the measurement result.

6. The pressing device according to claim 4, further comprising a working tool mounting section for mounting the working tool.

7. A pressing device which is used together with a working tool when working of a plate portion is performed, in such a manner as to be moved along a working line in a region in the vicinity of said working line while the surface of said plate portion in the vicinity of said working line is pressed in the plate thickness direction to prevent the floating of a portion to be worked, comprising:

a roller for pressing said region in the vicinity of the working line;

a frame for supporting said roller;

a mechanism for rotationally moving said roller support frame around a predetermined axis substantially perpendicular to the working advance direction of said pressing device; and a servomotor for driving said rotational movement mechanism.

8. The pressing device according to claim 7, further comprising means for measuring the position or speed of said roller and means for carrying out feedback control according to the measurement result.

9. The pressing device according to claim 7, further comprising a working tool mounting section for mounting the working tool.

10. The pressing device according to claim 1, wherein a linear motor is used in place of said servomotor, and said linear motor also serves as said linear movement mechanism.

11. The pressing device according to claim 4, wherein a desired pressing force is obtained by controlling the current of said servomotor.

12. The pressing device according to claim 1, wherein said working tool mounting section is provided at a position on the fixed side of the movement mechanism of said pressing device.

13. The pressing device according to claim 1, wherein said working tool mounting section is provided at a position on the moving side of the movement mechanism of said pressing device.

14. The pressing device according to claim 1, further comprising an observer for estimating a pressing force of said roller and means for carrying out force feedback control based on a commanded pressing force and an estimated pressing force estimated by said observer.

15. The pressing device according to claim 1, wherein said working is laser beam machining.

16. A working robot in which said pressing device described in claim 1, is installed at the distal end of a robot arm.

17. The working robot according to claim 16, wherein said servomotor of the pressing device is controlled by a robot controller.

18. The working robot according to claim 1, wherein a robot teaching pendant is provided with means capable of inputting at least any one of the position, speed, and pressing force of said roller support frame of the pressing device and the distance between said working tool mounted on said working tool mounting section and said plate portion.

19. The working robot according to claim 1, wherein at least any one of the position, speed, and pressing force of said roller support frame of the pressing device and the distance between said working tool mounted on said working tool mounting section and said plate portion is commanded by a robot program command.

20. An apparatus to work on a plate, comprising:
a roller;
a servomotor to drive the roller and press the roller in a thickness direction of the plate; and
a welder to weld the plate, wherein the servomotor drives the roller to optimize a relationship between a position of a weld point of the welder and the plate and a position where the plate portion is pressed by the roller.

21. The pressing device according to claim 1, wherein the servomotor moves said roller linearly to press said roller on said plate portion.

* * * * *